US010922663B2

United States Patent
Chittaluru et al.

(10) Patent No.: US 10,922,663 B2
(45) Date of Patent: Feb. 16, 2021

(54) METHOD FOR RECOMMENDING MUTUALLY-AGREEABLE LOCATIONS

(71) Applicant: SSYD, Inc., Virginia Beach, VA (US)

(72) Inventors: Hari Chittaluru, Boca Raton, FL (US); Victor Tavernini, Davie, FL (US); Jeffrey Diamond, Delray Beach, FL (US)

(73) Assignee: SSYD, Inc., Virginia Beach, VA (US)

( * ) Notice: Subject to any disclaimer, the term of this patent is extended or adjusted under 35 U.S.C. 154(b) by 118 days.

(21) Appl. No.: 15/973,858

(22) Filed: May 8, 2018

(65) Prior Publication Data

US 2018/0330336 A1 Nov. 15, 2018

Related U.S. Application Data

(60) Provisional application No. 62/504,265, filed on May 10, 2017.

(51) Int. Cl.
*G06Q 10/10* (2012.01)
*G06F 7/02* (2006.01)

(52) U.S. Cl.
CPC ......... *G06Q 10/1095* (2013.01); *G06F 7/026* (2013.01)

(58) Field of Classification Search
CPC .............................. G06Q 10/00; G06Q 40/00
USPC ...................................................... 705/7.19
See application file for complete search history.

(56) References Cited

U.S. PATENT DOCUMENTS

| 9,080,876 | B2 | 7/2015 | Denicola |
| 9,584,606 | B2 | 2/2017 | Kao et al. |
| 2011/0184772 | A1* | 7/2011 | Norton .................. G06Q 10/02 705/7.18 |
| 2013/0080262 | A1* | 3/2013 | Scott .................... G06Q 10/109 705/14.68 |
| 2013/0117058 | A1* | 5/2013 | Norton .................. G06Q 10/02 705/7.16 |
| 2013/0345964 | A1* | 12/2013 | Denicola ............ G01C 21/3438 701/422 |
| 2015/0006221 | A1* | 1/2015 | Mermelstein ...... G06Q 10/1093 705/7.19 |
| 2015/0058057 | A1* | 2/2015 | Egan .................. G06Q 10/1095 705/7.19 |

(Continued)

OTHER PUBLICATIONS

Addie Broyles, "Austin-based Dindr wants you to swipe right for food you like", http://food.blog.austin.360.com/2016/03/11/austin-based/dindr-wants-you . . . , retrieved May 7, 2018, 5 pages.

*Primary Examiner* — Romain Jeanty
(74) *Attorney, Agent, or Firm* — Dergosits & Noah LLP

(57) ABSTRACT

Methods and systems recommend a mutually-agreeable location to parties invited to a meeting. A method analyzes attributes of the meeting, attributes of the invited parties, and attributes of the various potential locations to prepare a list of recommended locations. To arrive at the list of recommended locations, the method may leverage all available attributes regarding the parties, the engagement type, and the potential locations, to create a value that represents a degree that a potential location correlates with the parties' attributes and meeting attributes. The set of recommended locations is sent to the invited parties. The method then determines, from party responses that each include a list of locations that are acceptable to that party, which of the recommended locations is agreed upon.

35 Claims, 5 Drawing Sheets

(56) References Cited

U.S. PATENT DOCUMENTS

| | | | |
|---|---|---|---|
| 2015/0193819 A1* | 7/2015 | Chang | G06Q 30/0252 |
| | | | 705/7.19 |
| 2015/0356516 A1* | 12/2015 | Kagan | G06Q 10/1095 |
| | | | 705/7.19 |
| 2016/0019485 A1* | 1/2016 | Hosabettu | G06Q 10/06314 |
| | | | 705/7.19 |
| 2016/0098687 A1* | 4/2016 | Lamons | G06Q 10/1095 |
| | | | 705/7.19 |
| 2016/0148165 A1* | 5/2016 | Prempeh | G06Q 10/1095 |
| | | | 705/7.19 |
| 2016/0189110 A1* | 6/2016 | Bombolowsky | G06Q 10/1095 |
| | | | 705/7.19 |
| 2018/0121883 A1 | 5/2018 | Kang | |

* cited by examiner

METHOD FOR RECOMMENDING MUTUALLY-AGREEABLE LOCATIONS

CROSS-REFERENCE TO RELATED APPLICATIONS

This application claims priority to U.S. Provisional Patent Application 62/504,265, entitled "METHOD FOR RECOMMENDING MUTUALLY-AGREEABLE LOCATIONS," filed on May 10, 2017, which is hereby incorporated by reference in its entirety.

BACKGROUND

Currently, two or more parties who do not have previous knowledge of each other still may have the desire to interact in-person, whether that interaction be for a Peer-to-Peer transaction, a business meeting, or a social outing. However, having no knowledge of the other, one party may hesitate to agree to a choice of location proposed by the other, since the proposed location may not provide the party with a desired sense of security, level of convenience, or other attribute desired for the type of interaction in which the parties intend to engage.

Often, when two or more parties have the desire to meet in person they must exchange information, such as current location and/or home or office address, so that the parties can mutually agree on a place to meet. Once suggestions for meeting locations and times are made, the parties then need to agree on one location. This exchange of information typically results in back and forth communication, either by voice, email, or text, and results either in: (1) one party offering a location with which they are familiar while the other party conforms and agrees to meet in otherwise unknown territory, (2) both parties agreeing to meet at a location neither have previously been to and therefore do not have a feeling for the level of security provided by the location.

This back and forth dialogue and pre-meeting ritual is not unique to parties with no previous knowledge of one another. Often when two or more parties who do have previous experience with each other want to meet this same ritual exists, leading to prolonged discussions to determine a location that is desirable to both parties. This element of location desirability often relies on the following factors: (1) centrality of the location, (2) hours of operation, (3) type of engagement, (4) number of individuals meeting, (5) convenience and features of the location, and (6) safety of the location. Accordingly, there is a need for a system that provides location recommendations based on user preferences and type of engagement to satisfy the users' needs for agreeable meeting places while providing adequate levels of security, safety, and convenience.

BRIEF DESCRIPTION OF THE DRAWINGS

Advantages of the subject matter claimed will become apparent to those skilled in the art upon reading this description in conjunction with the accompanying drawings, in which like reference numerals have been used to designate like elements, and in which:

DETAILED DESCRIPTION

Figure 1:
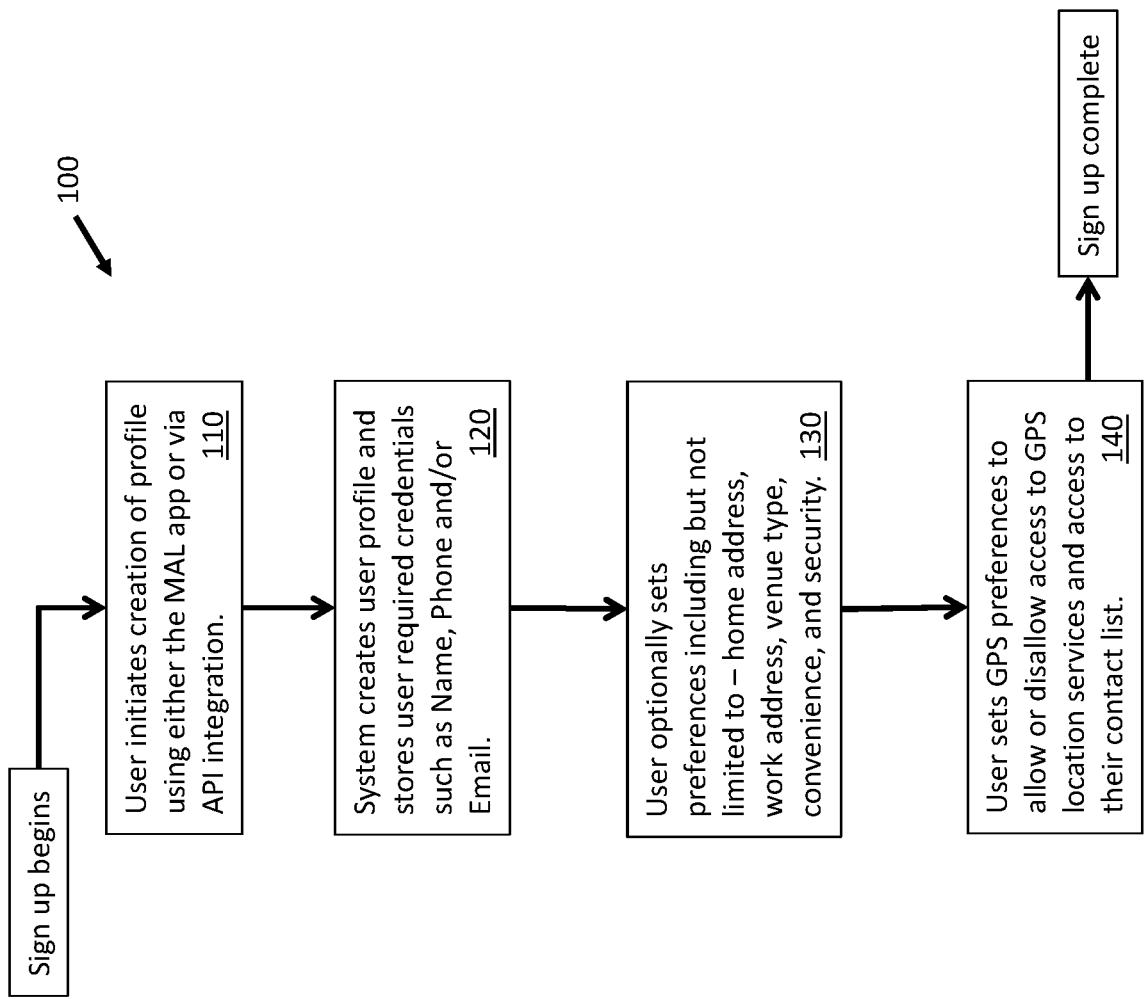
FIG. 1 is a flow chart illustrating an embodiment of a sign-up process for a method that provides mutually-agreeable locations.

Embodiments provide methods and systems for recommending a mutually-agreeable location ("MAL") to parties invited to a meeting. A MAL process analyzes attributes of the meeting, attributes of the invited parties, and attributes of the various potential locations to prepare a list of recommended locations. To arrive at the list of recommended locations, the MAL process may leverage all available attributes regarding the parties, the meeting type, and the potential locations, to create a value that represents a degree that a potential location correlates with the parties' attributes and meeting attributes. The set of recommended locations is sent to the invited parties. The MAL process then determines, from party responses that each include a list of locations that are acceptable to that party, which of the recommended locations is agreed upon. In an embodiment, for each engagement, there may be locations that are sponsored and locations that are non-sponsored. The set of recommended locations supplied to users may contain a configurable number of sponsored results and an independently configurable number of non-sponsored results. The MAL process employed for choosing and ranking both sponsored and non-sponsored results may leverage the same intelligence.

Capture of User and User Attributes and Preferences

Embodiments may be applicable in online marketplaces or other online website/communities where the exchange of goods or services is provided and further applicable for dating sites and applications, reservation applications and sites, integration into CRM's, calendaring and email applications, and as a standalone application or website. Embodiments may be available to third party sites and applications via MAL's Application Program Interface (MAL API). A MAL application may also connect and integrate with home automation tools such as Google Home, Apple HomePod and Amazon Echo. (See, for example, FIG. 3 and the related discussion.) In embodiments, a MAL process is intended to provide parties with location recommendations that are tailored to the users' preferences and type of engagement, and that further satisfy the users' needs to find a convenient place to meet while also providing an increased level of security and safety.

Setting up a user profile for a MAL application or website can be accomplished in several ways. A first involves using the user's data from third party applications such as Gmail, Facebook, LinkedIn, and others as a means of establishing a MAL profile. Additionally, a user can set up a profile by going to a MAL website or downloading the MAL application. When MAL is integrated with a third-party platform, website, or application such as a market place, dating/match making, or CRM the MAL API may import and utilize the existing profile of the user. The MAL API may also allow integrated apps to add and modify information in user's profiles imported by those apps.

In an embodiment, there is a sign-up process for using a MAL process (e.g., via a MAL application or MAL website).

When a user begins profile creation, the MAL sign-up process may present the user with basic profile inputs such as home and office addresses, phone number, email address, and other such user attributes. Once a profile is established the MAL process may then present the user with optional selection preferences. A user's selected optional preferences enable the MAL process to further refine recommendations to meet the user's preferences and also act as a starting point for the MAL process to begin applying a learning process. Preferences may include but are not limited to: time preferences, day of week preferences, location preferences (i.e., restaurants, coffee shops, retail stores, libraries, fire stations, police stations, etc.), convenience preferences (i.e., parking, max distance from home/office, max travel time, etc.), safety preferences (i.e., onsite staff, security camera/CCTV present, onsite security, crime index at the Zip/Zip+4, etc.), privacy preferences (e.g., visibility from public areas, availability of private rooms), and an option to enable the MAL process to receive a user device's GPS data (e.g., to allow the MAL process to automatically determine a user's location for the purposes of determining a recommended location).

FIG. 1 is a flow chart illustrating an embodiment of a process 100 for signing up to use a MAL application. In the sign-up process 100, in step 110, a user initiates the creation of a profile using either a MAL application, or using a API, which interfaces with a MAL application. In step 120, the MAL application creates a user profile and stores user-required credentials, such a name, telephone number, and email address. In optional step 130, the user may set preferences, such as home address, work address, venue type, convenience features (e.g., first floor access, available elevator, available parking, etc.), and security features (e.g., public area, covered by security cameras, etc.). In optional step 140, the user sets GPS preferences, which determine whether the MAL application may access GPS locations services regarding the user, and access the user's contact list. Optional step 140 completes sign-up process 100.

Capture of Location Attributes and Creation of a Location Profile

In an embodiment, the MAL process architecture includes profile information on locations as well as on individuals. The MAL process may build a location profile with location attributes such as, but not limited to: address, name, onsite parking, handicap accessible, hours of operation, latitude and longitude, CCTV enabled, onsite security on staff, human staff on site, user feedback, etc. Moreover, the MAL process may ingest third-party data, such as Yelp Reviews, Open Table ratings, Four Square data, and Google ratings to further enhance the location profile established in the MAL architecture. Such third-party data may be obtained via the MAL API. In an embodiment, such third-party location data may be obtained via batch file upload of a database extract from the third-party location data provider, or via a real-time API call to an API provided by the third-party location data provider.

In an embodiment, users and companies may submit location referrals via a MAL application, MAL web interface, batch upload, or MAL API for vetting and inclusion into the MAL location profile database.

Location Determination and Ranking Process

The engine behind the overall MAL process is its location determination and ranking process. In an embodiment, the location determination and ranking process utilizes the user and location attributes to generate a series of location recommendations that best correlate to the variables of the users and engagement type. The process may leverage all available attributes on the user and the engagement type in a fitness determination process that measures the fitness of a user, and their desired engagement, against an available location contained within the location database.

In an embodiment, for each engagement there may be locations that are sponsored and those that are non-sponsored. The recommendation set supplied to users may contain a configurable number of sponsored results and an independently configurable number of non-sponsored results. The process employed for choosing and ranking both sponsored and non-sponsored results may leverage the same intelligence.

In an embodiment, the fitness determination process may iterate through the available locations contained within the location database and evaluate the fitness of each location by comparing the location against each user that has accepted the meeting invitation. The fitness determination process estimates (or predicts) the desirability of primary attributes including: location attributes (l), user attributes (u), engagement type (e), and time of day (t). In such a case the fitness termination process may be considered to be dependent on u, l, e, and t. In an embodiment, additional attributes beyond the primary attributes can be utilized within the fitness determination process. Such additional attributes may include preferences (p) and history (h), independently or in combination with the primary function attributes (u, l, e, t). The MAL process may use the fitness determination process to score each user (or attendee) for each location available. The fitness determination process sums that individual score with the other users (or attendees) score for the same location. The resulting value (also potentially referred to as a "score") is the fitness of that location as a possible venue for that set of users and for that specific engagement. It is this resulting value that acts as a basis for the ranking of locations. This process is to obtain a value for each location. The ranking can be done by utilizing a lowest value approach (when the fitness value is crafted where a lower value if more desirable), or a highest value approach (when the fitness score is crafted where a higher value is more desirable). In an embodiment, instead of a simple "sum," the fitness determination process combines that individual score with the other users (or attendees) score for the same location, e.g., using weighted individual scores.

Sponsored Results

In an embodiment, the MAL process provides users with a ranking of location results. As part of the ranked result set, and utilizing the same fitness determination process, the embodiment presents a list of locations that is prioritized to best meet the collective needs of the users and engagement type. A potential location that is a sponsor will have an indicator as a location attribute in its profile. In an embodiment, this sponsor indicator requires that the fitness determination process be run twice (1) once with the indicator attributes included and (2) once without the indicator attributes included. The resulting set of locations, after the dual run, will result in a priority list of locations. The top sponsored locations will be placed in priority order over those locations who are unsponsored—without regard for overall fitness value. In an embodiment, the sponsored results are required to meet a minimum or maximum fitness value to be included in the result set ("minimum or maximum" depending on the value approach being utilized). In an embodiment, a sponsorship fee for a sponsored location is paid by the company or companies who receive preferred placements in a set of recommended locations. In an embodiment, configurable aspects of sponsorship include the number of sponsorships and the price model for those sponsorships. For example, the price model may vary by geography, engagement type, item being transacted, transaction volume, number of parties in the engagement, and other known variables. In an embodiment, the sponsorship fee paid may be divided among several interested parties, e.g., the MAL process owner and a third-party website invoking the MAL process through the MAL API.

In an embodiment, the MAL process may generate a basic set of recommended locations based upon a minimum set of user attributes, such as: user address (e.g., home, office, or present address), and time of day. In the embodiment, the MAL process may also generate an enhanced set of recommendations by including other types of data in the fitness determination process, such as: type of transaction (exchange of goods/services, and types of goods and or services being exchanged), type of engagement (social, business, transaction), personal preferences, past history, and whether or not there are sponsored results that correlate to the party's needs, preferences and type of engagement.

Transaction Workflow—Via Mal Application and Website

In an embodiment, a MAL may be determined by a user accessing a MAL application or MAL website. For example, a meeting organizer has the option to engage another party via MAL by logging into the application and sending the party or parties a MAL invite. In the embodiment, a MAL invite is initiated by submitting the receiving party or parties' MAL username(s), phone number(s), or email address(es). If a MAL invite is initiated via the MAL application, the MAL process will present the initiator with a meet request form. The form requires basic input from the meeting organizer, such as: meet now, meet later-day/time, relationship (new or existing), and type of meet (transaction, social, business, etc.), and acceptance timing (i.e., the point in time at which a response is required or the MAL process will interpret a non-response as a denial to meet). Once the form is complete, the MAL process initiates sending the invite to the receiving party or parties. The receiving party or parties will receive a notification via email, text, or directly through the MAL application to either accept or reject the invitation. Once accepted the MAL process will recommend a series of locations provided via the recommendation process. In the embodiment, these recommendations are dynamic, meaning the list of recommended locations is based upon the party or parties who have accepted the invite.

In an embodiment, the MAL process offers the meeting organizer the ability to designate required and optional attendees. The MAL process's recommendation process may then modify location recommendations based on whether the attendees who accept are required or optional attendees for the meeting.

In an embodiment, the receiving parties (the organizer and the invitees) may receive the MAL notification (perhaps as a push notification or other type of alert) and be prompted to enter the MAL application or MAL website. If the receiving parties do not have the MAL application, a text or email with a unique hyperlink may be sent to the receiving parties. This hyperlink may take the recipient to the MAL website to login, establish a profile, or proceed as a guest, all in an effort to get the party to respond to the invite sent. Moreover, a hyperlink may be presented to the receiving party that will take the party directly to the application store or marketplace to download the MAL application.

In an embodiment, once the required parties agree on a location (chosen from the list of recommended places) and a match is made, the MAL process initiates a calendar invite, reminder, or notification for future occurrences. The MAL application may provide directions (e.g., utilizing third party GPS applications such as Google Maps, Waze, Apple Maps, etc.) to all parties. The MAL application may also provide meeting attendees with a safety feature which, when initiated, logs, for future reference by the attendee or other designated party, details of the meeting including attendee names, time and location of the meet, and the reason for the meeting (social, business, transaction of good/service). Additionally, an alert feature can also direct dial emergency services (e.g., through the user's phone service if the MAL process is being used via a mobile device, or otherwise been given access to the mobile device) and share with those emergency services the details captured in the safety log and the user's location.

In an embodiment, if the parties do not mutually agree (or "match") on a location the MAL process will generate another set of recommendations for the parties. This new recommendation set will not contain previously declined locations from proceeding iterations of recommendations for the meeting in question. Additionally, new sets of sponsored and non-sponsored locations may be made available as discussed with regard to the initial set, except without duplicates from that initial set. This process may continue until the parties mutually agree on a location for meeting.

In an embodiment, after the parties have met, the MAL process may send an email survey or present an in-application survey to capture feedback on the meeting and location. This survey may differ based upon meeting type (transaction, social, business) as well as by other factors or meeting attributes. This feedback survey and metadata behind the meeting may be used to enhance future recommendation computations, improve the accuracy of the location attributes, and enhance the user(s) preferences.

Transaction Workflow API Integration

In an embodiment, a variety of online marketplace, dating, reservation, service, calendaring, CRM websites, applications and platforms may have connectivity with MAL via the MAL API. For example, when a user who has an existing profile with any of the aforementioned applications, websites, or platforms engages another Party with the intent to meet, the MAL process, as invoked by the third party using the MAL API, will seamlessly initiate the MAL recommendation workflow.

Based upon the business and objectives of the third party, MAL may provide recommendations to the users participating on the third-party websites, applications, and platforms. In other words, the MAL process may attribute third-party attributes to a meeting. For example, if a user is on a dating platform and if that platform integrates to the MAL process with the MAL API, then a user wanting to meet with a person they matched with may initiate a meet via the integrated MAL feature. Based on attributes of the dating platform (e.g., either provided by the dating platform or determined by the MAL process), and leveraging the users' locations and user preferences, MAL will provide location recommendations that provide the parties with safe date friendly options such as restaurants, bars, and coffee shops. Similarly, if users of an online marketplace that is integrated with the MAL process via the MAL API, are organizing a meeting to exchange goods or services, then the MAL process will recommend places that match attributes from the listing or listing website, and that meet other exchange criteria, such as user safety (e.g., CCTV, human staff, parking, etc.). In other words, the MAL process will recommend locations that are tuned to the exchange type and user's preferences (i.e., an exchange of golf clubs may result in a set of recommended locations that includes retail locations such as Dicks Sporting Goods, Golf USA, etc.).

Additionally, in an embodiment, the MAL process may determine a website associated with both the first party and the second party. The MAL process may then determine one or more attributes associated with the website. Based on the associated website attributes, the MAL process may recommend more highly the particular locations that are also associated somehow with the website attributes. For example, two parties may have both visited a golf-centric website. Upon one of those parties using the MAL process to set up a meeting, the MAL process may obtain such party history and, as a result of determining the golf-link between the parties, the MAL process may recommend golf-centric places, such as golf-courses or ranges, more highly than other non-golf-related locations. In an embodiment, the MAL process may determine one or more attributes associated with each party's network history and recommend locations more highly based on that attribute or attributes. For example, the parties may have histories of visiting golf-centric webpages, or histories of searches related to golf-centric topics.

In the embodiment, and as discussed earlier with reference to the MAL application and MAL website, if the parties do not mutually agree (or "match") on a location the MAL process will generate another set of recommendations for the parties. This new recommendation set will not contain previously declined locations from proceeding iterations of recommendations for the meeting in question. Additionally, new sets of sponsored and non-sponsored locations may be made available as discussed with regard to the initial set, except without duplicates from that initial set. This process may continue until the parties mutually agree on a location for meeting.

In the embodiment, after the parties have met, the MAL process may send an email survey or present an in-application survey to capture feedback on the meeting and location. This survey may differ based upon meeting type (transaction, social, business) as well as by other factors or meeting attributes. This feedback survey and metadata behind the meeting may be used to enhance future recommendation computations, improve the accuracy of the location attributes, and enhance the user(s) preferences.

Transaction Workflow Via Home Automation

In an embodiment, a variety of home-automation devices (including but not limited to Amazon Alexa™, Google Home™, and Apple HomePod™) may leverage the MAL API to access the MAL process. Thus, in the embodiment, a user may access features of an embodiment of a MAL application using natural language through voice recognition software in a device (or voice recognition features associated with a third-party website, such as LetGo™, or Match.com™). The home automation device may transform the recommended set presented by the MAL API into a voice offering, which may also be made available via the home automation's mobile or web-based application interfaces.

In the embodiment, when presenting locations to a user, the home automation device may ask the user which of the locations the user would want to: (1) learn more about, (2) accept, or (3) deny/pass/next. In an embodiment, the functionality of the voice offering may also permit the user to, e.g.: generate a new list by declining all suggested locations; send the chosen location to the other user(s); send location details to their smart phone; and create a reminder, as well as capture user feedback and preferences and history. That is, in an embodiment, a user may interact with a MAL application via a home automation device.

As with other MAL process delivery embodiments, the recommendation of locations may be presented to all parties and each party may accept or reject the locations presented. If the parties do not mutually agree (or "match") on a location the MAL process will generate another set of recommendations for the parties. This new recommendation set will not contain previously declined locations from proceeding iterations of recommendations for the meeting in question. Additionally, new sets of sponsored and non-sponsored locations may be made available as discussed with regard to the initial set, except without duplicates from that initial set. This process may continue until the parties mutually agree on a location for meeting.

After the parties have met, the home automation device, the MAL application, or both may request feedback in the form of a survey to capture feedback on the meeting and location. This survey may differ based upon engagement type (e.g., transaction, social, or business) as well as by other factors. This feedback survey and metadata behind the meeting may be used to enhance future applications of the recommendation process, improve the accuracy of the location attributes, and enhance user preferences.

Figure 2:
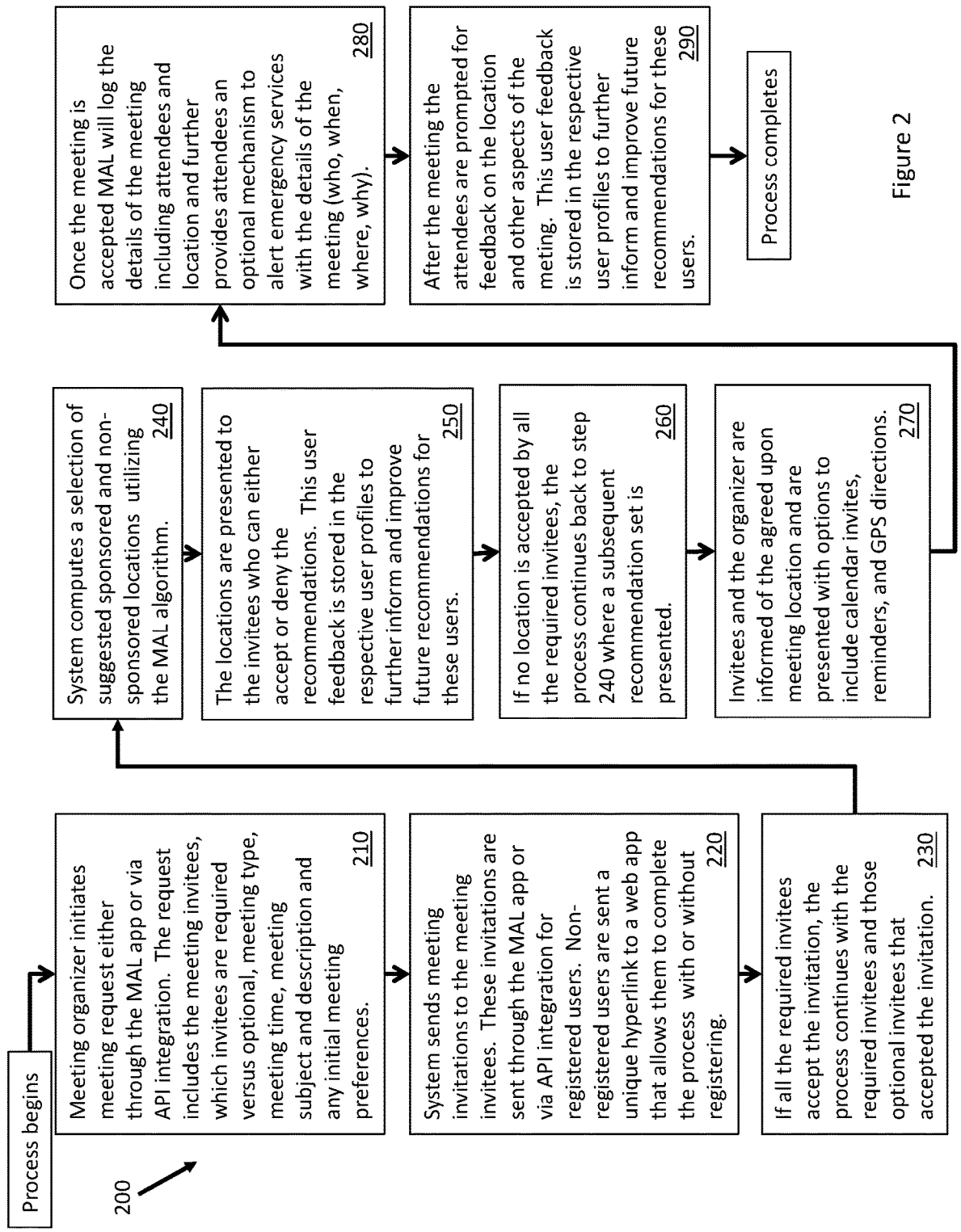
FIG. 2 is a flow chart illustrating an embodiment of a method for providing mutually-agreeable locations.

FIG. 2 illustrates a flow chart of an embodiment of a transaction process 200 by which the mutually-agreeable location may be determined. Process 200 for determining a mutually aggregable location begins with step 210, in which a meeting organizer initiates a meeting request either through the MAL application or via API integration. The initiated request results from the organizer providing the MAL application with meeting specifics, including, e.g., the meeting invitees, which invitees are required versus optional, a meeting type, a meeting time, a meeting subject, a meeting description, and any initial meeting preferences. In step 220, based on the information received from the organizer, the MAL application sends meeting invitations to the meeting invitees. These invitations may be sent through the MAL application, or via API integration. In an embodiment, sending via API integration may require the user be registered, with non-registered users being sent a unique hyperlink to a web application that allows them to complete the process with or without registering. In step 230, if all the required invitees accept the invitation, the process continues with the required invitees and those optional invitees that accepted the invitation. In step 240, the MAL application computes a selection of suggested sponsored and non-sponsored locations utilizing the MAL process discussed earlier. In step 250, the suggested locations are presented to the invitees, who then can either accept or deny the recommendations. In step 260, if no location is accepted by all the required invitees, the process reverts to step 240, where a second selection of suggested sponsored and non-sponsored locations are determined, and to step 250, where the second selection is presented to the invitees. In step 270, invitees and the organizer are informed of the agreed upon meeting location. In an embodiment, the invitees and organizer are presented with options to include, with the meeting location, calendar invites, reminders, and GPS directions. In an embodiment, the calendar invites, reminders, and GPS directions are options that may an invitee may choose to receive, or may forward to another person. In step 280, once the meeting is accepted (i.e., after step 260) the MAL application will log the details of the meeting including attendees and location. In an embodiment, the MAL application may provide attendees with an optional mechanism whereby an attendee may alert emergency services with the details of the meeting (who, when, where, why). For example, the MAL application may allow an attendee to schedule the sending of an email with such meeting details for a future time. In step 290, after the meeting, the MAL application prompts the attendees for feedback regarding the location and other aspects of the meeting. Process 200 is completed with the user feedback being stored in the respective user profiles to further inform and improve future recommendations for the associated user.

In an embodiment, the number of iterations of steps 240 and 250 that are performed in process 200 may be arbitrarily limited by the meeting organizer, by an MAL system administrator, or by both. In an embodiment, the feedback from step 250 (i.e., whether a particular invitee accepts or declines an invitation to a particular location) is stored in the respective user profiles to further inform and improve future recommendations for these users.

In an embodiment, a method for determining a mutually-agreeable location is performed by a software component (e.g., running on a processor of server system 322 (FIG. 3 and FIG. 4)). In the embodiment, the software component receives a request for meeting invite from a first party, e.g., a meeting organizer. In the request, the first party includes identifying information about a second party. In response to receiving the request, the software transmits to the first party a meeting request form that requires input from the first party regarding attributes of the proposed meeting. The software component subsequently receives back the meeting request form after the first party has input attributes of the proposed meeting. The software component then determines a set of potential locations for the proposed meeting. This determination is based on a profile of the first party, a profile of the second party, the attributes of the proposed meeting, and sets of location attributes, each set of location attributes being associated with an individual location. The software then creates a match value for each of the potential locations for the meeting and then, based on the match values, a descending-rank ordered set from the potential locations. The match value for each potential location is determined by the software component from: the stored attributes for the potential location: the first party profile; the second party profile; and the proposed meeting attributes. The match value for each potential location indicates a degree of match between, on one side, the stored attributes for the potential location and, on the other side, the first party profile, the second party profile, and the proposed meeting attributes. The software component then transmits the descending-rank ordered set of potential locations to the first and second parties. In some cases the party profiles may have been stored in advance of the request for meeting invite, e.g., by a party having prepared their own profile. In other cases, the party profiles may be generated in response to a request associated with the specific meeting request, and then stored.

In another embodiment, a method for determining a mutually-agreeable location is performed by a software component (e.g., running on a processor of server system 322 (FIG. 3 and FIG. 4)). In this embodiment, the software component receives a request for meeting invite from a first party. That meeting request may come to the software component by way of a third-party application or website accessing the software component through an API. In this request the first party includes information identifying a second party. Then, in response to receiving the request for meeting invite, the software component directs the transmission of a meeting request form to the first party, where this meeting request form requires first party to input proposed meeting attributes. Subsequently, the software component receives the meeting request form containing proposed meeting attributes input by the first party. The software component then determines a set of potential locations for the proposed meeting based on a first party profile, a second party profile, the proposed meeting attributes, and sets of location attributes, each potential location having an associated set of location attributes. From this set of potential locations, the software component creates a descending-rank ordered set of potential locations for the proposed meeting. To create the descending-rank ordered set, the software component first creates a match value for each of the potential locations for the meeting and then, based on the match values, a descending-rank ordered set from the potential locations as discussed with regard to the previous embodiment. The software component then transmits the descending-rank ordered set of potential locations to the parties.

In another embodiment, a method for determining a mutually-agreeable location is performed by a software component (e.g., running on a processor of server system 322 (FIG. 3 and FIG. 4)). In this embodiment, the software component receives information identifying a second party and proposed meeting attributes for a proposed meeting. This information may come to the software component by way of a third-party application or website accessing the software component through an API. The software component then determines a set of potential locations for the proposed meeting based on a first party profile, a second party profile, the proposed meeting attributes, and sets of location attributes, each potential location having an associated set of location attributes. From this set of potential locations, the software component creates a descending-rank ordered set of potential locations for the proposed meeting. To create the descending-rank ordered set, the software component first creates a match value for each of the potential locations for the meeting and then, based on the match values, a descending-rank ordered set from the potential locations as discussed with regard to the two previous embodiments. The software component then transmits the descending-rank ordered set of potential locations to the parties.

A further aspect of the embodiments may include the software component receiving a set of responses from each party, where each set of responses includes the potential locations that are acceptable to the responding party. The software component then uses the match values of the acceptable locations from each party to determine a recommended location. For example, the software component may determine that, of the potential locations that are acceptable to both parties, a particular location has the highest match value. The software component may then recommend that location (with the highest match value of the locations that are acceptable to both parties) as the mutually-agreeable location.

In addition, a further aspect of the embodiments regards each of the locations in the descending-rank ordered set of potential locations and whether a party accepted or rejected the location. Specifically, the software component may store whether the first party or the second party included, or did not include, a specific potential location in that party's set of acceptable locations. The stored location choice is associated with that particular party's profile. In a subsequent computation of a match value using that party's profile, the software component may use a party's previous acceptance or rejection of a location as a factor that affects the match value for that location. For example, if a party has previously accepted a particular location, that fact may increase the match value associated with that location and the particular party. Conversely, if the party has previously rejected a particular location, that fact may decrease the match value associated with that location and the particular party.

A further aspect of the embodiments may relate to there being more parties being invited to meet than just the second party. In this aspect, a request for meeting invite includes information identifying each of the number of parties, or the software component otherwise receives identifying information for each of the number of parties. Furthermore, the request or information may designate that some of the parties are required. In this aspect, the set of potential locations are determined by the software component based on the first party profile, a profile of each of the number of parties, the proposed meeting attributes, and the sets of location attributes. Similarly, the match value for each of the potential locations determines a degree of match between, on one hand, the attributes for a potential location and, on the other hand, the first party profile, each profile from the number of parties, and the proposed meeting attributes. Also, the descending-rank ordered set of potential locations is transmitted to every party. Subsequently, the software component may receive confirmations from a subset of the plurality of parties. Then, when every required party is not included in the confirming subset of parties, the software component determines a second set of potential locations for the proposed meeting. As before, the second set is determined based upon the first party profile, the party profiles for each of the plurality of parties, the proposed meeting attributes, and the sets of stored location attributes. However, the second set of potential locations does not include any of the previous set of potential locations. The software component then descending-rank orders the second set of potential locations as previously described and transmits the second descending-rank ordered set of potential locations to all the parties.

In a further aspect of the embodiments, the software component may estimate an importance of each location attribute in each set of location attributes and modify the match value for each of the potential locations based on the estimated importance of each location attribute in each set of location attributes. For example, the software component may determine a website associated with both the first party and the second party (e.g., from ingested information regarding the parties). The software component may then determine a first attribute associated with the website. Then, when estimating the importance of the various location attributes, the software will increase the estimated performance of the first attribute associated with the website—because of the commonality between that attribute and both parties.

In a further aspect of the embodiments, the second party profile may include information obtained from sources other than the second party. For example, the second party profile may include location information obtained from: an access by the software component of a GPS-enabled computing device associated with the second party; an access by the software component of a network-enabled computing device associated with the second party; an access by the software component of a third-party database with information regarding the second party; and a performing by the software component of a search of a network for information regarding the second party. Furthermore, regarding this aspect of the embodiments, the second party profile may be developed by the software component using machine learning from any information obtained from an access by the software component of a GPS-enabled computing device, the access by the software component of a network-enabled computing device, the access by the software component of a third-party database, or the performing by the software component of a search of a network.

In a further aspect of the embodiments, a location attribute for a potential location may include an advertisement associated with the potential location. For example, a location may be holding a sale, or offering coupons. Furthermore, a location attribute may be that the potential location is a sponsored location, such that selection of the sponsored location (or even the inclusion of the sponsored location in the list of potential locations) results in revenue being directed to, e.g., the owner of the software component, or the server hosting the software component.

Similarly, in a further aspect of the embodiments, a location attribute for a potential location may include a revenue value associated with the potential location and how much revenue it provides if selected, as, for example, one of the potential locations, a recommended location, or an ultimately-selected location. The software component may then perform a descending-rank ordering of the set of potential locations for the proposed meeting based upon the revenue value for each potential location in the set of potential locations to create a revenue-based descending-rank ordered set of potential locations. This revenue-based descending-rank ordered set of potential locations may then be send to the parties.

Additional embodiments include systems comprising at least one processor with memory and connected to a network, the memory including instructions, which when executed by the at least one processor, cause the at least one processor to perform the steps of any of the embodiments of MAL methods discussed within this specification.

In an embodiment, the MAL process may be used to determine a potential location from the set of recommended locations that is acceptable to more invitees than any other recommended location. The MAL process may then designate the most-acceptable location as the location for the meeting. In an embodiment, the MAL process may determine a most-acceptable location by receiving responses from a set of invited parties, where each response includes a set of potential locations that are acceptable to that party. From the many sets of acceptable locations, the MAL process then determines the potential location that is included more often than any other. The MAL application then provides that most-acceptable location to the invitees (including those that may not have responded) as the location for the meeting. This embodiment may be used when all required parties find more than one recommended location to be acceptable. This embodiment may also be used where there are no required parties—in this case the MAL process may be used to determine the recommended location that will result in the largest "turnout."

In an embodiment, if required parties do not mutually agree (or "match") on a location the MAL process will generate another set of recommendations for the parties where the second set of recommended locations may include locations from the first set of recommended locations, even though the location was not initially agreed upon by all parties. In this embodiment, the MAL process may determine that one (or more) of the first recommended locations was acceptable to more parties than the other first recommended locations. In the embodiment, the MAL process may include that (or those) locations in a second set of recommended locations—in case some of the parties who initially rejected the location change their minds.

In an embodiment, the meeting organizer may have the ability to rank each invited party as to the importance or desirability of that party's attendance. In this embodiment, the given rank for each party may be used to weight the attributes of that party in relation to the other parties. For example, a required party's attributes may be given full weight in the MAL determination of recommended locations, while an optional party's response may be weighted one-quarter of a full weight.

In an embodiment, an attribute of any party may include an indication of the likelihood that the party will follow through on attending a meeting. In this embodiment, the likelihood of follow-through for each party may be used to weight the responses from that party in relation to the other parties.

Figure 3:
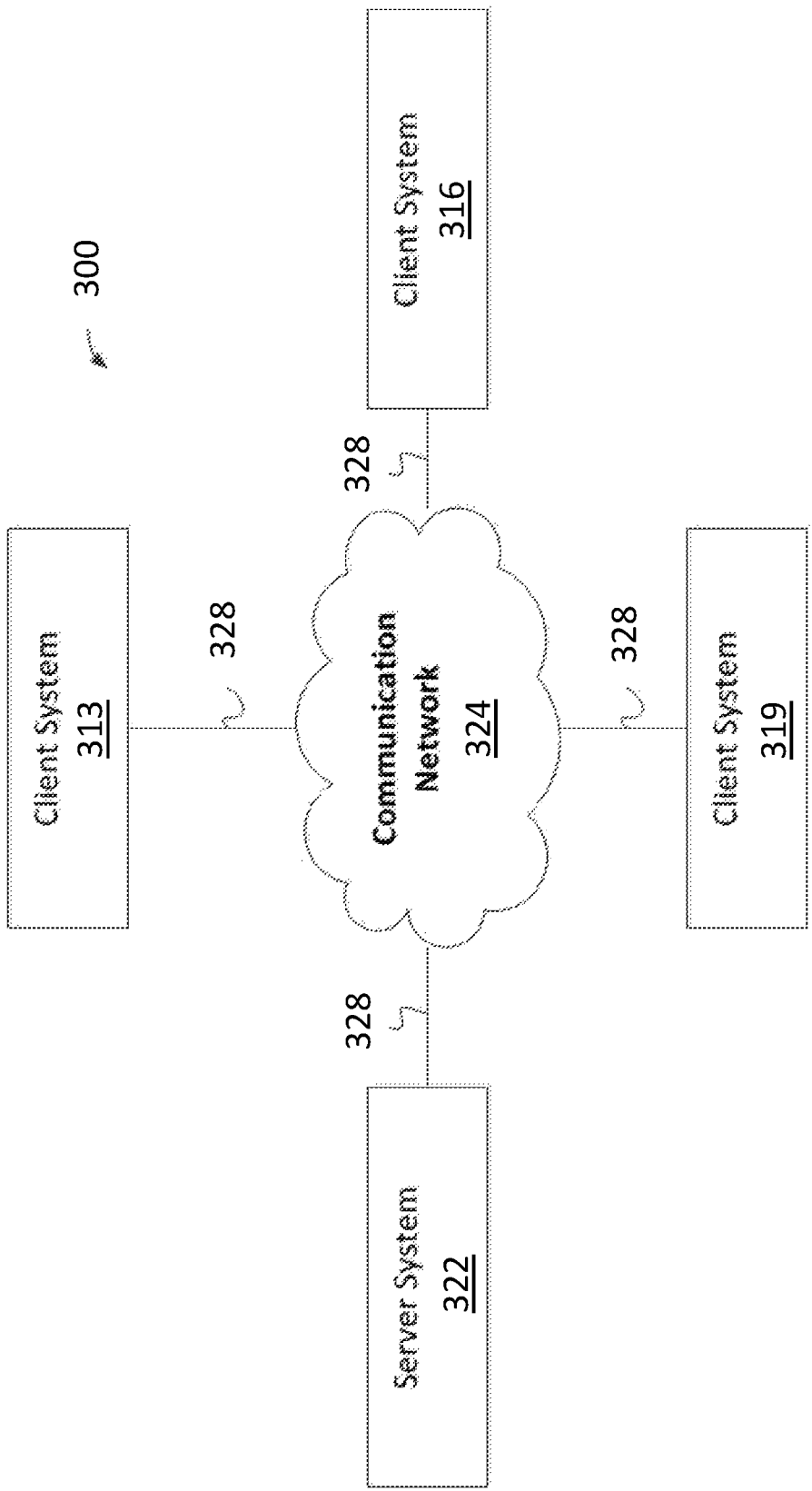
FIG. 3 is a simplified block diagram illustrating a distributed computer network in accordance with some embodiments.

Those of ordinary skill in the art will appreciate that the elements illustrated in FIG. 3 may vary depending on the system implementation. FIG. 3 is a simplified block diagram of a distributed computer network 300 for implementing an embodiment of a MAL application. Computer network 300 includes a number of client systems 313, 316, and 319, and a server system 322 coupled to a communication network 324 via a plurality of communication links 328. There may be any number of clients and servers in a system. Communication network 324 provides a mechanism for allowing the various components of distributed network 300 to communicate and exchange information with each other.

Communication network 324 may itself be comprised of many interconnected computer systems and communication links. Communication links 328 may be hardwire links, optical links, satellite or other wireless communications links, wave propagation links, or any other mechanisms for communication of information. Various communication protocols may be used to facilitate communication between the various systems shown in FIG. 3. These communication protocols may include TCP/IP, HTTP protocols, wireless application protocol (WAP), vendor-specific protocols, customized protocols, and others. While in one embodiment, communication network 324 is the Internet, in other embodiments, communication network 324 may be any suitable communication network including a local area network (LAN), a wide area network (WAN), a wireless network, an intranet, a private network, a public network, a switched network, and combinations of these, and the like.

Distributed computer network 300 in FIG. 3 is merely illustrative of an embodiment and is not intended to limit the scope of the embodiments as recited in the claims. One of ordinary skill in the art would recognize other variations, modifications, and alternatives. For example, more than one server system 322 may be connected to communication network 324. As another example, a number of client systems 313, 316, and 319 may be coupled to communication network 324 via an access provider (not shown) or via some other server system.

Client systems 313, 316, and 319 typically request information from a server system which provides the information. For this reason, server systems typically have more computing and storage capacity than client systems. However, a particular computer system may act as both a client and a server depending on whether the computer system is requesting or providing information. Additionally, although aspects of the embodiments have been described using a client-server environment, it should be apparent that the embodiments may also use a stand-alone computer system. Aspects of the embodiments may also use a client-server environment or a cloud-computing environment.

Server 322 is responsible for receiving information requests from client systems 313, 316, and 319, performing processing required to satisfy the requests, and forwarding the results corresponding to the requests back to the requesting client system. The processing required to satisfy the request may be performed by server system 322 or may alternatively be delegated to other servers connected to communication network 324.

Client systems 313, 316, and 319 enable users to access and query information stored by server system 322. In a specific embodiment, a "Web browser" application executing on a client system enables users to select, access, retrieve, or query information stored by server system 322. Examples of web browsers include the Internet Explorer browser program provided by Microsoft Corporation and the Firefox browser provided by Mozilla Foundation, and others.

The client or server system may use a user interfaces with the system through a computer workstation system. The client or server system may include a monitor, a screen, a cabinet, a keyboard and a mouse. The mouse may have one or more buttons such as mouse buttons. The system may also include a cabinet that houses familiar computer components, some of which are not shown, such as a processor, memory, mass storage devices, and the like.

Mass storage devices associated with the client or server may include mass disk drives, floppy disks, magnetic disks, optical disks, magneto-optical disks, fixed disks, hard disks, CD-ROMs, recordable CDs, DVDs, recordable DVDs (e.g., DVD-R, DVD+R, DVD-RW, DVD+RW, HD-DVD, or Blu-ray Disc), flash and other nonvolatile solid-state storage (e.g., USB flash drive), battery-backed-up volatile memory, tape storage, reader and other similar media, and combinations of these.

A computer-implemented or computer-executable version of a MAL application may be embodied using, stored on, or associated with computer-readable medium or non-transitory computer-readable medium. A computer-readable medium may include any medium that participates in providing instructions to one or more processors for execution. Such a medium may take many forms including, but not limited to, nonvolatile, volatile and transmission media. Nonvolatile media includes, for example, flash memory, or optical or magnetic disks. Volatile media includes static or dynamic memory, such as cache memory or RAM. Transmission media includes coaxial cables, copper wire, fiber optic lines and wires arranged in a bus. Transmission media can also take the form of electromagnetic, radio frequency, acoustic, or light waves, such as those generated during radio wave and infrared data communications.

For example, a binary, machine-executable version, of the software of the embodiments may be stored or reside in RAM or cache memory, or on mass storage device. The source code of the software may also be 1 or reside on mass storage device (e.g., hard disk, magnetic disk, tape, or CD-ROM). As a further example, code may be transmitted via wires, radio waves, or through a network such as the Internet.

Figure 4:
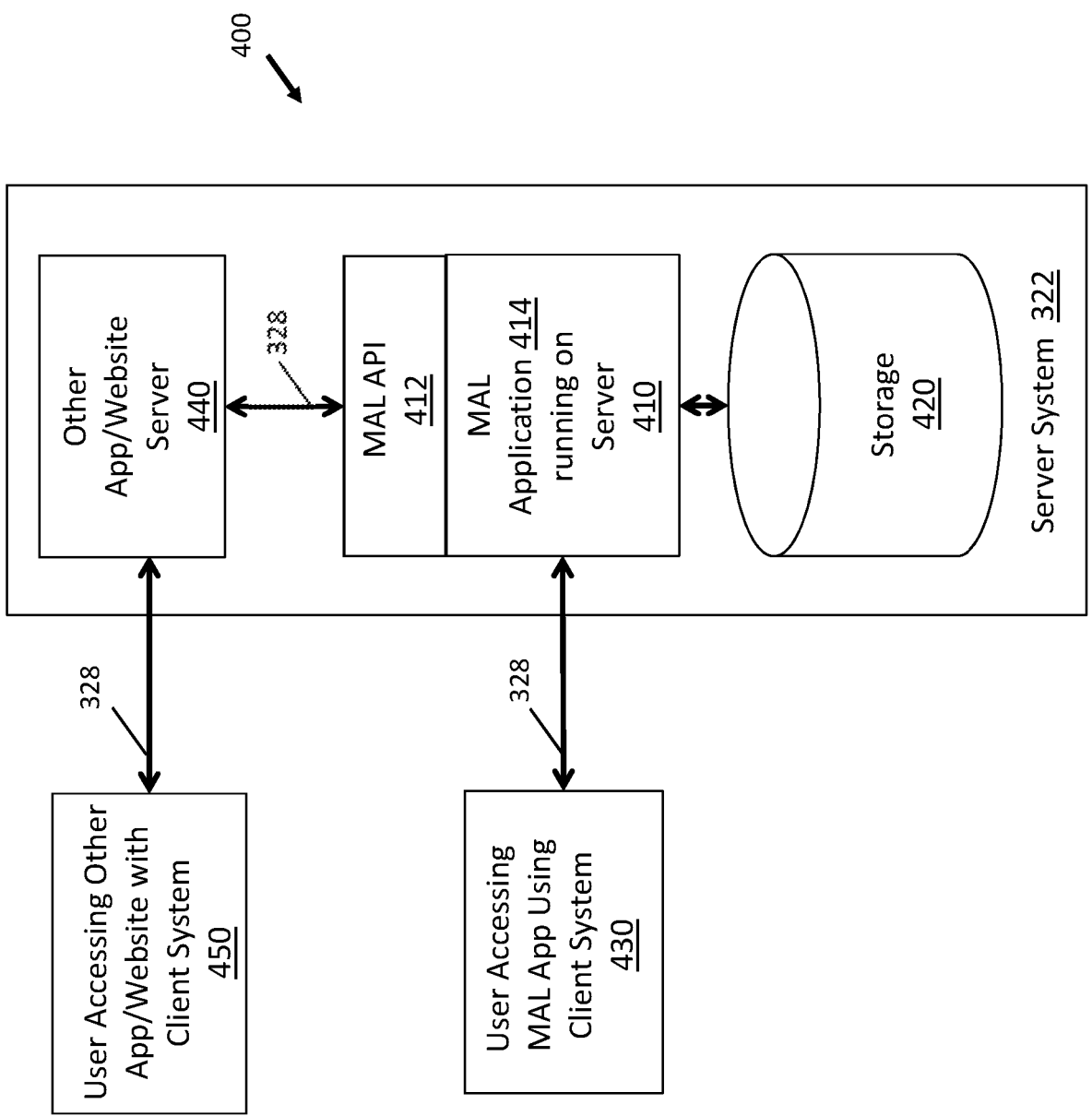
FIG. 4 is a simplified block diagram illustrating the interaction of different devices and servers in a computer network in accordance with some embodiments.

FIG. 4 is a simplified block diagram of a distributed computer network 400 for implementing embodiments of a MAL application. Computer network 400 includes a number of client systems 430, 450 (as described with regard to FIG. 3 and client systems 313, 316, and 319) coupled by communication links 328 to a server system 322. In the embodiment of FIG. 4, server system 322 includes a MAL application server 410 with an associated storage 420, and application/website server 440. Application/website server 440 represents any number of servers for supporting other applications or websites that may interface with a MAL application 414 using a MAL API 412 over communication link 328. Thus, in the embodiment of FIG. 4, server system 322 is itself a distributed server system with MAL application server 410 in communication with each application/website server 440 over a communication link 328 and communication network 324 (FIG. 3).

Thus, in embodiments a user may employ the features of MAL application 414 by using a client system 450 to visit a third-party website hosted by a server 440, where the third-party website accesses the features of MAL application 414 through MAL API 412. Such embodiments may be applicable for, e.g., online marketplaces and other online websites and communities where the exchange of goods or services are provided, dating sites and applications, reservations sites and applications, CRM calendaring, and email applications. In other embodiments, a user may employ the features of MAL application 414 by using client system 430 to directly visit a MAL website (not shown) running MAL application 414.

Figure 5:
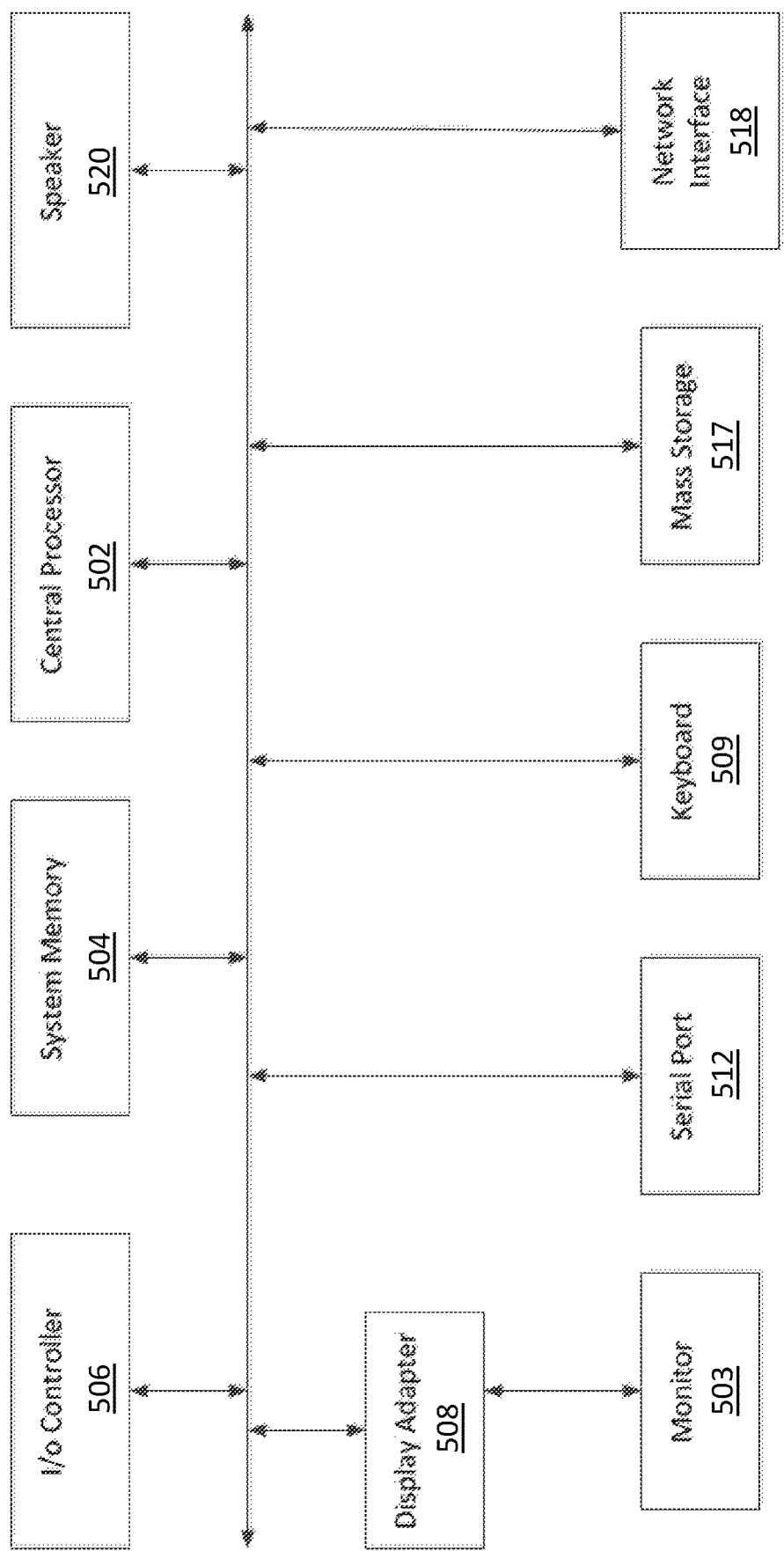
FIG. 5 is a simplified system block diagram illustrating a computer system, such as the client or server systems in accordance with some embodiments.

FIG. 5 shows a system block diagram of a computer system, such as the client or server systems of FIG. 3 and FIG. 4. The computer system includes a monitor 503, a keyboard 509 and a mass storage device 517. Computer system 500 further includes subsystems such as a central processor 502, a system memory 504, an input/output (I/O) controller 506, a display adapter 508, a serial or universal serial bus (USB) port 512, a network interface 518 and a speaker 520. In alternative embodiments, a computer system may include additional or fewer subsystems. For example, a computer system could include more than one processor 502 (i.e., a multiprocessor system) or a system may include a cache memory.

Arrows, as illustrated in FIG. 5, represent the system bus architecture of computer system 500. However, these arrows are illustrative of any interconnection scheme serving to link the subsystems. For example, speaker 520 could be connected to the other subsystems through a port or have an internal direct connection to central processor 502. The processor may include multiple processors or a multicore processor, which may permit parallel processing of information. Computer system 500 shown in FIG. 5 is but an example of a suitable computer system. Other configurations of subsystems suitable for use will be readily apparent to one of ordinary skill in the art.

Computer software products may be written in any of various suitable programming languages, such as C, C++, C#, Pascal, Fortran, Perl, Matlab (from MathWorks), SAS, SPSS, JavaScript, AJAX, Java, SQL and XQuery (a query language that is designed to process data from XML files or any data source that can be viewed as XML, HTML, or both). The computer software product may be an independent application with data input and data display modules. Alternatively, the computer software products may be classes that may be instantiated as distributed objects. The computer software products may also be component software such as Java Beans (from Oracle Corporation) or Enterprise Java Beans (EJB from Oracle Corporation). In a specific embodiment, the claimed subject matter provides a computer program product which stores instructions such as computer code to program a computer to perform any of the processes or techniques described.

An operating system for the system may be one of the Microsoft Windows® family of operating systems (e.g., Windows 95, 98, Me, Windows NT, Windows 2000, Windows XP, Windows XP x64 Edition, Windows Vista, Windows 7, Windows CE, Windows Mobile), Linux, HP-UX, UNIX, Sun OS, Solaris, Mac OS X, Alpha OS, AIX, IRIX32, or IRIX64. Other operating systems may be used. Microsoft Windows is a trademark of Microsoft Corporation.

Furthermore, the computer may be connected to a network and may interface to other computers using this network. The network may be an intranet, internet, or the Internet, among others. The network may be a wired network (e.g., using copper), telephone network, packet network, an optical network (e.g., using optical fiber), or a wireless network, or any combination of these. For example, data and other information may be passed between the computer and components (or steps) of the system using a wireless network using a protocol such as Wi-Fi (IEEE standards 802.11, 802.11a, 802.11b, 802.11e, 802.11g, 802.11i, and 802.11n, just to name a few examples). For example, signals from a computer may be transferred, at least in part, wirelessly to components or other computers.

In an embodiment, with a Web browser executing on a computer workstation system, a user accesses a system on the World Wide Web (WWW) through a network such as the Internet. The Web browser is used to download web pages or other content in various formats including HTML, XML, text, PDF and postscript, and may be used to upload information to other parts of the system. The Web browser may use uniform resource identifiers (URLs) to identify resources on the Web and hypertext transfer protocol (HTTP) in transferring files on the Web.

The examples provided herein are non-exhaustive and many other examples of programming techniques and usage instances of the customer protection platform are within the scope and spirit of the disclosure.

The use of the terms "a" and "an" and "the" and similar referents in the context of describing the subject matter (particularly in the context of the following claims) are to be construed to cover both the singular and the plural, unless otherwise indicated herein or clearly contradicted by context. Recitation of ranges of values herein are merely intended to serve as a shorthand method of referring individually to each separate value falling within the range, unless otherwise indicated herein, and each separate value is incorporated into the specification as if it were individually recited herein. Furthermore, the foregoing description is for the purpose of illustration only, and not for the purpose of limitation, as the scope of protection sought is defined by the claims as set forth hereinafter together with any equivalents thereof entitled to. The use of any and all examples, or exemplary language (e.g., "such as") provided herein, is intended merely to better illustrate the subject matter and does not pose a limitation on the scope of the subject matter unless otherwise claimed. The use of the term "based on" and other like phrases indicating a condition for bringing about a result, both in the claims and in the written description, is not intended to foreclose any other conditions that bring about that result. No language in the specification should be construed as indicating any non-claimed element as essential to the practice of the subject matter as claimed.

Preferred embodiments are described herein, including the best mode known to the inventor for carrying out the claimed subject matter. Of course, variations of those preferred embodiments will become apparent to those of ordinary skill in the art upon reading the foregoing description. The inventor expects skilled artisans to employ such variations as appropriate, and the inventor intends for the claimed subject matter to be practiced otherwise than as specifically described herein. Accordingly, this claimed subject matter includes all modifications and equivalents of the subject matter recited in the claims appended hereto as permitted by applicable law. Moreover, any combination of the above-described elements in all possible variations thereof is encompassed unless otherwise indicated herein or otherwise clearly contradicted by context.

We claim:

1. A method comprising:
    at a software component executing on a processor, receiving a request for a meeting from a first party, the request including identifying information about a second party;
    at the software component, in response to receiving the request for a meeting from the first party, transmitting to the first party a meeting request form, the meeting request form requiring first party input of proposed meeting attributes;
    at the software component, receiving the meeting request form containing proposed meeting attributes input by the first party;
    at the software component, determining a set of potential locations for the proposed meeting, the determining based upon a stored first party profile, a stored second party profile, the proposed meeting attributes, and sets of stored location attributes retrieved by the software component by an access of a networked database, each potential location having an associated set of stored location attributes;
    at the software component, descending-rank ordering the set of potential locations for the proposed meeting to create a first descending-rank ordered set of potential locations, the descending-rank ordering based upon a match value determined for each potential location in the set of potential locations, the match value indicating the degree of match between (1) the stored attributes for the potential location and (2) the first party profile, the second party profile, and the proposed meeting attributes, the match value for each potential location the result of the software component comparing the first party profile, the second party profile, and the proposed meeting attributes against the retrieved sets of stored location attributes;
    at the software component, providing the first descending-rank ordered set of potential locations to the first party and, over a network, to the second party with associated requests for responses;
    at the software component, receiving a first response including a first set of acceptable locations from the first party and, over the network, a second response including a second set of acceptable locations from the second party, each set of acceptable locations selected by the party from the set of potential locations;
    at the software component, determining based on the match values and a comparison of the first set of acceptable locations and the second set of acceptable locations, a first recommended location; and
    at the software component, providing the first recommended location to the first party and, over the network, the second party as a final location for the meeting.

2. The method of claim 1, wherein whether the first party or the second party includes a specific potential location in that party's set of acceptable locations is stored by the software component and used, by the software component in a subsequent computation of a match value between the party and the specific potential location, as a factor that affects a degree of match between the specific potential location and the party, the factor positively affecting the degree of match when the specific potential location was included in the party's set of acceptable locations, and the factor negatively affecting the degree of match when the specific potential location was not included in the party's set of acceptable locations.

3. The method of claim 1, wherein:
    the request includes identifying information about a plurality of parties, the second party being one of the plurality of parties,
    the request includes a set of required parties, each required party being from the plurality of parties,
    the determining a set of potential locations for the proposed meeting is further based on stored party profiles of each of the plurality of parties,
    the match value indicates the degree of match between (1) the stored attributes for the potential location and (2) the first party profile, the plurality of party profiles, and the proposed meeting attributes, and,
    the first descending-rank ordered set of potential locations is transmitted to the first party and the plurality of parties; the method further comprising:
    at the software component, receiving confirmations from a subset of the plurality of parties; and, when every required party is not included in the confirming subset of parties:
    i. at the software component, determining a second set of potential locations for the proposed meeting, the determining based upon the stored first party profile, the stored party profiles for each of the plurality of parties, the proposed meeting attributes, and the sets of stored location attributes, the second set of potential locations not including any of the first set of potential locations;
    ii. at the software component, descending-rank ordering the second set of potential locations for the proposed meeting, the descending-rank ordering based upon a match value determined for each potential location in the set of potential locations, the match value indicating the degree of match between (1) the stored attributes for the potential location and (2) the first party profile, the stored party profiles for each of the plurality of parties, and the proposed meeting attributes; and,
    iii. at the software component, transmitting the second descending-rank ordered set of potential locations to the first party and the plurality of parties.

4. The method of claim 1 further comprising:
    at the software component, estimating an importance of each location attribute in each set of location attributes; and
    at the software component before the descending-rank ordering, modifying the match value for each of the potential locations based on the estimated importance of each location attribute in each set of location attributes.

5. The method of claim 4 further comprising:
    obtaining the network history of both the first party and the second party;
    at the software component from the obtained network history, determining a website associated with both the first party and the second party;
    at the software component, determining a first attribute associated with the website, wherein the estimating an importance of each location attribute in each set of location attributes includes increasing the estimated importance of the first attribute.

6. The method of claim 1, wherein the second party profile is the result of an access by the software component of a GPS-enabled computing device to obtain second party location information.

7. The method of claim 1, wherein the second party profile is developed, by the software component using machine learning, from information obtained from at least one of: an access by the software component of a GPS-enabled computing device, an access by the software component of a network-enabled computing device, and a performing by the software component of a search of a network.

8. The method of claim 1, wherein a location attribute for a potential location includes an advertisement associated with the potential location.

9. The method of claim 1, wherein a location attribute for a potential location includes a revenue value associated with the potential location, the method further comprising:
   at the software component, performing a descending-rank ordering of the set of potential locations for the proposed meeting based upon the revenue value for each potential location in the set of potential locations to create a second descending-rank ordered set of potential locations; and,
   at the software component, transmitting the second descending-rank ordered set of potential locations to the first party and the second party.

10. The method of claim 1, wherein the second party profile is the result of an access by the software component of a network-enabled computing device to obtain second-party network history.

11. The method of claim 1, wherein the second party profile is the result of a performing by the software component of a search of a network.

12. The method of claim 1, wherein one or both of the stored first party profile and the stored second party profile were obtained by the software component from a third-party platform, website, or application.

13. The method of claim 1, wherein at least one set of stored location attributes includes attributes obtained by the software component from a third-party data source.

14. The method of claim 13, wherein the obtained attributes were obtained from at least one of: a batch file upload of a database extract from the third-party data source; or a real-time application programming interface (API) call to an API provided by the third-party data source.

15. The method of claim 1, wherein the transmitting the first descending-rank ordered set of potential locations to the second party includes transmitting, by the software component, a notification to the second party directing the second party to access an application or website to view the descending-rank ordered set of potential locations.

16. The method of claim 1 further comprising:
   at the software component, initiating the sending of a calendar invite to the first party and the second party.

17. The method of claim 1 further comprising, at the software component, logging details related to the meeting, the logged details being accessible by a third party not present at the meeting.

18. A method comprising:
   at a software component executing on a processor, receiving over a network a request for a meeting, the request initiated by a first party, the request including identifying information about a second party;
   at the software component, in response to receiving the request for a meeting, directing to the first party over the network a meeting request form, the meeting request form requiring first party input of proposed meeting attributes;
   at the software component, receiving over the network the meeting request form containing proposed meeting attributes input by the first party;
   at the software component, determining a set of potential locations for the proposed meeting, the determining based upon a stored first party profile, a stored second party profile, the proposed meeting attributes, and sets of stored location attributes retrieved by the software component by an access of a networked database, each potential location having an associated set of stored location attributes;
   at the software component, descending-rank ordering the set of potential locations for the proposed meeting, the descending-rank ordering based upon a match value determined for each potential location in the set of potential locations, the match value indicating the degree of match between (1) the stored attributes for the potential location and (2) the first party profile, the second party profile, and the proposed meeting attributes, the match value for each potential location the result of the software component comparing the first party profile, the second party profile, and the proposed meeting attributes against the retrieved sets of stored location attributes;
   at the software component, directing over the network the first descending-rank ordered set of potential locations to the first party and the second party;
   at the software component, receiving, over the network, a first response including a first set of acceptable locations from the first party and, over the network, a second response including a second set of acceptable locations from the second party, each set of acceptable locations selected by the party from the set of potential locations;
   at the software component, determining based on the match values and a comparison of the first set of acceptable locations and the second set of acceptable locations, a first recommended location; and
   at the software component, providing, over the network, the first recommended location to the first party and the second party as a final location for the meeting.

19. The method of claim 18 further comprising:
   at the software component, estimating an importance of each location attribute in each set of stored location attributes; and
   at the software component before the descending-rank ordering, modifying the match value for each of the potential locations based on the estimated importance of each location attribute in each set of stored location attributes.

20. The method of claim 19 further comprising:
   obtaining the network history of both the first party and the second party;
   at the software component from the obtained network history, determining a website associated with both the first party and the second party;
   at the software component, determining a first attribute associated with the website, wherein the estimating an importance of each location attribute in each set of location attributes includes increasing the estimated importance of the first attribute.

21. A method comprising:
   at a software component executing on a processor, receiving over a network from a first party, identifying information about a second party and proposed meeting attributes for a proposed meeting;
   at the software component, determining a set of potential locations for the proposed meeting, the determining based upon a stored first party profile, a stored second party profile, the proposed meeting attributes, and sets of stored location attributes retrieved by the software component by an access of a networked database, each potential location having an associated set of stored location attributes;

at the software component, descending-rank ordering the set of potential locations for the proposed meeting, the descending-rank ordering based upon a match value determined for each potential location in the set of potential locations, the match value indicating the degree of match between (1) the stored attributes for the potential location and (2) the first party profile, the second party profile, and the proposed meeting attributes, the match value for each potential location the result of the software component comparing the first party profile, the second party profile, and the proposed meeting attributes against the retrieved sets of stored location attributes; and, at the software component, transmitting the descending-rank ordered set of potential locations over the network to the first party and the second party;

at the software component, receiving, over the network, a first response including a first set of acceptable locations from the first party and, over the network, a second response including a second set of acceptable locations from the second party, each set of acceptable locations selected by the party from the set of potential locations;

at the software component, determining based on the match values and a comparison of the first set of acceptable locations and the second set of acceptable locations, a first recommended location; and at the software component, providing, over the network, the first recommended location to the first party and the second party as a final location for the meeting.

22. The method of claim 21 further comprising:
at the software component, estimating an importance of each location attribute in each set of stored location attributes; and
at the software component before the descending-rank ordering, modifying the match value for each of the potential locations based on the estimated importance of each location attribute in each set of stored location attributes.

23. The method of claim 22 further comprising:
obtaining the network history of both the first party and the second party;
at the software component from the obtained network history, determining a website associated with both the first party and the second party;
at the software component, determining a first attribute associated with the website, wherein the estimating an importance of each location attribute in each set of location attributes includes increasing the estimated importance of the first attribute.

24. A system comprising:
at least one processor with memory and connected to a network, the memory including instructions, which when executed by the at least one processor, cause the at least one processor to:
receive a request for a meeting from a first party, the request including identifying information about a second party;
in response to receiving the request for a meeting from the first party, provide to the first party a meeting request form, the meeting request form requiring first party input of proposed meeting attributes;
receive the meeting request form containing proposed meeting attributes input by the first party;
determine a set of potential locations for the proposed meeting, the determining based upon a stored first party profile, a stored second party profile, the proposed meeting attributes, and sets of stored location attributes retrieved by the at least one processor by an access of a networked database, each potential location having an associated set of stored location attributes;
descending-rank order the set of potential locations for the proposed meeting, the descending-rank ordering based upon a match value determined for each potential location in the set of potential locations, the match value indicating the degree of match between (1) the stored attributes for the potential location and (2) the first party profile, the second party profile, and the proposed meeting attributes, the match value for each potential location the result of the at least one processor comparing the first party profile, the second party profile, and the proposed meeting attributes against the retrieved sets of stored location attributes;
provide the first descending-rank ordered set of potential locations to the first party and, over a network connection, to the second party with associated requests for responses;
receive a first response including a first set of acceptable locations from the first party and, over the network, a second response including a second set of acceptable locations from the second party, each set of acceptable locations selected by the party from the set of potential locations;
determine based on the match values and a comparison of the first set of acceptable locations and the second set of acceptable locations, a first recommended location; and
provide the first recommended location to the first party and, over the network, the second party as a final location for the meeting.

25. The system of claim 24, wherein:
the request includes identifying information about a plurality of parties, the second party being one of the plurality of parties,
the request includes a set of required parties, each required party being from the plurality of parties,
the determining a set of potential locations for the proposed meeting is further based on stored party profiles of each of the plurality of parties,
the match value indicates the degree of match between (1) the stored attributes for the potential location and (2) the first party profile, the plurality of party profiles, and the proposed meeting attributes, and,
the first descending-rank ordered set of potential locations is transmitted to the first party and the plurality of parties; the instructions, when executed by the at least one processor, further causing the at least one processor to:
receive confirmations from a subset of the plurality of parties; and, when every required party is not included in the confirming subset of parties:
  i. determine a second set of potential locations for the proposed meeting, the determining based upon the stored first party profile, the stored party profiles for each of the plurality of parties, the proposed meeting attributes, and the sets of stored location attributes, the second set of potential locations not including any of the first set of potential locations, ii. descending-rank order the second set of potential locations for the proposed meeting, the descending-rank ordering based upon a match value determined for each potential location in the set of potential locations, the match value indicating the degree of match between (1) the stored attributes for the potential location and (2) the first party profile, the stored party profiles for each of the plurality of parties, and the proposed meeting attributes, and, iii. transmit the first descending-rank ordered set of potential locations to the first party and the plurality of parties.

26. The system of claim 24, the instructions, when executed by the at least one processor, further causing the at least one processor to:
estimate an importance of each location attribute in each set of stored location attributes;
and,
before the descending-rank ordering, modify the match value for each of the potential locations based on the estimated importance of each location attribute in each set of stored location attributes.

27. The system of claim 26, the instructions, when executed by the at least one processor, further causing the at least one processor to:
obtain the network history of both the first party and the second party;
from the obtained network history, determine a website associated with both the first party and the second party; and
determine a first attribute associated with the web site, wherein the estimating an importance of each location attribute in each set of stored location attributes includes increasing the estimated importance of the first attribute.

28. The system of claim 24, wherein the second party profile is the result of at least one of:
an access by the at least one processor of a GPS-enabled computing device, an access by the at least one processor of a network-enabled computing device,
an access by the at least one processor of a third-party database, and
a performing by the at least one processor of a search of a network.

29. The system of claim 28, wherein the second party profile is developed, by the at least one processor using machine learning, from information obtained from at least one of:
an access by the at least one processor of a GPS-enabled computing device,
an access by the at least one processor of a network-enabled computing device,
an access by the at least one processor of a third-party database, and
a performing by the at least one processor of a search of a network.

30. A non-transitory, computer-readable storage medium having stored thereon a plurality of instructions, which, when executed by at least one processor, cause the at least one processor to:
receive a request for a meeting from a first party, the request including identifying information about a second party;
in response to receiving the request for a meeting from the first party, provide to the first party a meeting request form, the meeting request form requiring first party input of proposed meeting attributes;
receive the meeting request form containing proposed meeting attributes input by the first party;
determine a set of potential locations for the proposed meeting, the determining based upon a stored first party profile, a stored second party profile, the proposed meeting attributes, and sets of stored location attributes retrieved by the at least one processor by an access of a networked database, each potential location having an associated set of stored location attributes;
descending-rank order the set of potential locations for the proposed meeting, the descending-rank ordering based upon a match value determined for each potential location in the set of potential locations, the match value indicating the degree of match between (1) the stored attributes for the potential location and (2) the first party profile, the second party profile, and the proposed meeting attributes, the match value for each potential location the result of the at least one processor comparing the first party profile, the second party profile, and the proposed meeting attributes against the retrieved sets of stored location attributes;
provide the first descending-rank ordered set of potential locations to the first party and, over a network connection, to the second party with associated requests for responses;
receive a first response including a first set of acceptable locations from the first party and, over the network, a second response including a second set of acceptable locations from the second party, each set of acceptable locations selected by the party from the set of potential locations;
determine based on the match values and a comparison of the first set of acceptable locations and the second set of acceptable locations, a first recommended location; and provide the first recommended location to the first party and, over the network, the second party as a final location for the meeting.

31. The non-transitory, computer-readable storage medium of claim 30, wherein:
the request includes identifying information about a plurality of parties, the second party being one of the plurality of parties,
the request includes a set of required parties, each required party being from the plurality of parties,
the determining a set of potential locations for the proposed meeting is further based on stored party profiles of each of the plurality of parties,
the match value indicates the degree of match between (1) the stored attributes for the potential location and (2) the first party profile, the plurality of party profiles, and the proposed meeting attributes, and,
the first descending-rank ordered set of potential locations is transmitted to the first party and the plurality of parties; the instructions, when executed by the at least one processor, further causing the at least one processor to:
receive confirmations from a subset of the plurality of parties; and, when every required party is not included in the confirming subset of parties:
iv. determine a second set of potential locations for the proposed meeting, the determining based upon the stored first party profile, the stored party profiles for each of the plurality of parties, the proposed meeting attributes, and the sets of stored location attributes, the second set of potential locations not including any of the first set of potential locations, v. descending-rank order the second set of potential locations for the proposed meeting, the descending-rank ordering based upon a match value determined for each potential location in the set of potential locations, the match value indicating the degree of match between (1) the stored attributes for the potential location and (2) the first party profile, the stored party profiles for each of the plurality of parties, and the proposed meeting attributes, and, vi. transmit the first descending-rank ordered set of potential locations to the first party and the plurality of parties.

32. The non-transitory, computer-readable storage medium of claim 30, the instructions, when executed by the at least one processor, further causing the at least one processor to:

estimate an importance of each location attribute in each set of stored location attributes; and, before the descending-rank ordering, modify the match value for each of the potential locations based on the estimated importance of each location attribute in each set of stored location attributes.

33. The non-transitory, computer-readable storage medium of claim 32, the instructions, when executed by the at least one processor, further causing the at least one processor to:

obtain the network history of both the first party and the second party;

from the obtained network history, determine a website associated with both the first party and the second party; and determine a first attribute associated with the web site, wherein the estimating an importance of each location attribute in each set of stored location attributes includes increasing the estimated importance of the first attribute.

34. The non-transitory, computer-readable storage medium of claim 30, wherein the second party profile is the result of at least one of:

an access by the at least one processor of a GPS-enabled computing device, an access by the at least one processor of a network-enabled computing device, an access by the at least one processor of a third-party database, and a performing by the at least one processor of a search of a network.

35. The non-transitory, computer-readable storage medium of claim 34, wherein the second party profile is developed, by the at least one processor using machine learning, from information obtained from at least one of:

an access by the at least one processor of a GPS-enabled computing device, an access by the at least one processor of a network-enabled computing device, an access by the at least one processor of a third-party database, and a performing by the at least one processor of a search of a network.

* * * * *